May 23, 1967  A. L. HUBBARD  3,321,026
LAWN RENOVATOR
Filed Dec. 7, 1964
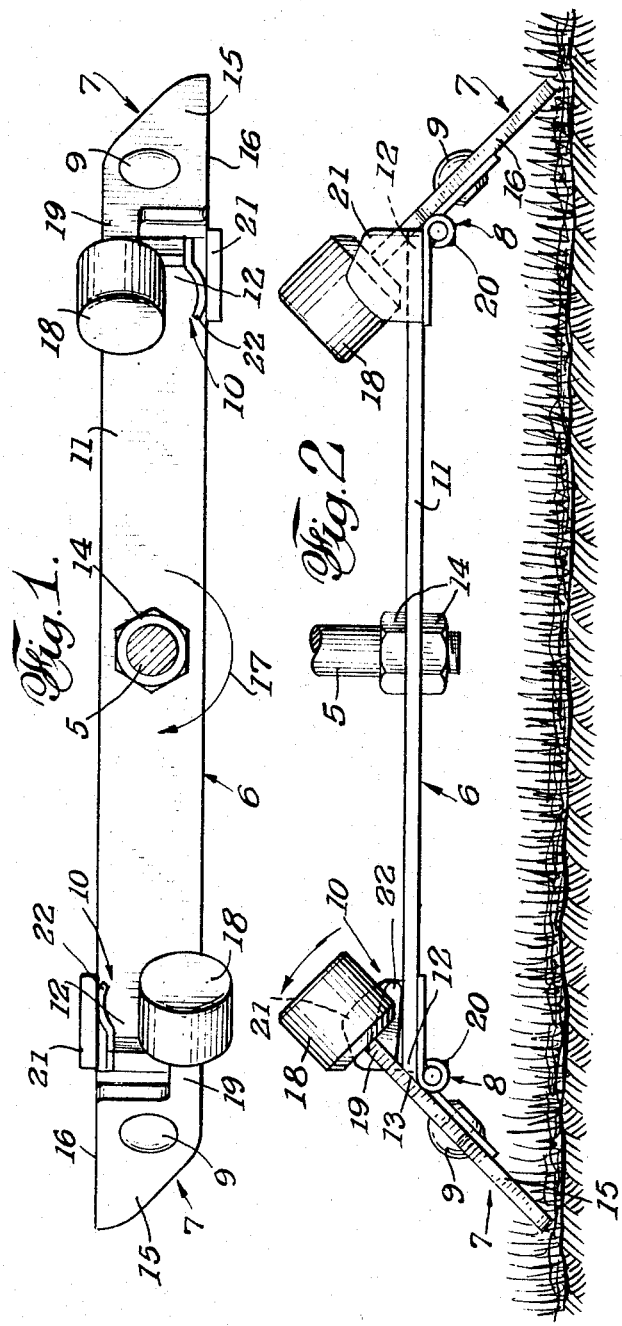
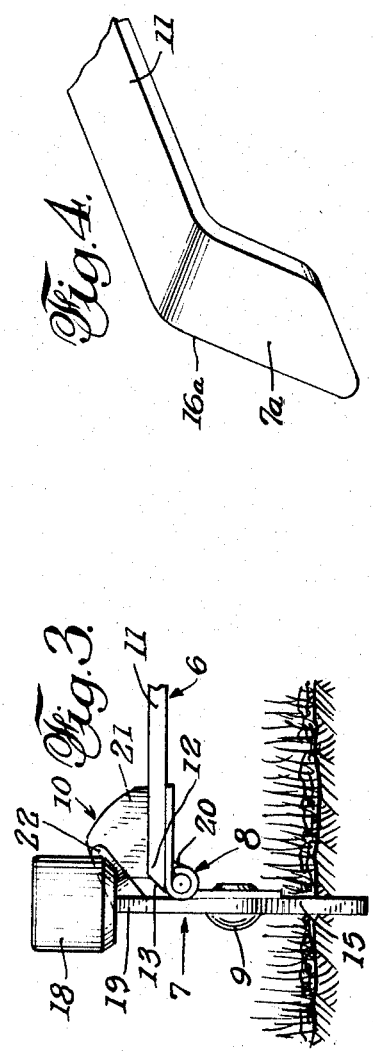
INVENTOR
ALBERT L. HUBBARD
BY
C. G. Stratton
ATTORNEY

United States Patent Office 3,321,026
Patented May 23, 1967

3,321,026
LAWN RENOVATOR
Albert L. Hubbard, 4721 Clover Drive, Apt. 2,
Oxnard, Calif. 93030
Filed Dec. 7, 1964, Ser. No. 416,487
6 Claims. (Cl. 172—45)

This invention relates to a lawn renovator of the type mounted for rotation about a vertical axis of a rotary lawn mower which is mounted on wheels for guided movement along the ground.

A lawn renovator with a horizontal, rotary blade on the opposite ends of which are provided pivoted and weighted renovator extensions that, under centrifugal force, pivotally move from downwardly and outwardly angled positions to vertical soil-renovating positions, and are adapted to retract when engaging obstructions.

An object of the present invention is to provide a blade-type renovator that has ends constructed to automatically assume soil-renovating positions due to centrifugal forces generated in said ends due to the high rotational speed of the blade.

Another object of the invention is to provide a renovator as above characterized that is protected against breakage as may be caused by encountering stones and other obstructions, either in the soil or in matted growths which the renovator is designed to eradicate.

A further object of the invention is to provide a blade lawn renovator that has tips or ends that are downwardly and outwardly inclined.

This invention also has for its objects to provide such means that are positive in operation, convenient in use, easily installed in a working position and easily disconnected therefrom, economical of manufacture, relatively simple, and of general superiority and serviceability.

The above objects of the invention are realized in a lawn renovator that comprises a horizontal blade mounted on a vertical shaft to spin, under a power drive, around the axis of said shaft with renovator tips or cutters on the opposite ends of the blade and disposed at downward and outward angles, mounted on pivots so as to retract or yield to obstructions. Said cutters are counterweighted to retain their angular disposition, but swing centrifugally, during operation of the renovator, on horizontal pivots to steeper angular positions so as to effect more efficient penetration into matted growth above the ground and also into the surface portions of the ground to so scarify the same as to render removal of unwanted growth easy and effective. When rotation stops, the cutters of the device automatically return to initial positions due to the counterweights and return spring means that resiliently urge the cutters back to their positions as before encountering obstructions.

The invention also comprises novel details of construction and novel combinations and arrangements of parts, which will more fully appear in the course of the following description, and which is based on the accompanying drawing. However, said drawing merely shows, and the following description merely describes, preferred embodiments of the present invention, which are given by way of illustration or example only.

In the drawing, like reference characters designate similar parts in the several views.

FIG. 1 is a plan view of a lawn renovator according to the present invention.

FIG. 2 is a side elevational view thereof.

FIG. 3 is an end view.

FIG. 4 is a broken perspective view of a cutter made integral with the renovator blade.

FIGS. 1 and 2 show a vertical shaft 5 that mounts the present renovator, said shaft being power driven and representing the output shaft of a rotary type lawn mower or similar machine.

The present renovator comprises, generally, a horizontal blade 6 that, at its middle, is fixedly connected to and rotates with the shaft 5, a counterweighted renovator cutter 7 at each end of the blade 6 and connected thereto by a horizontal hinge 8, said cutters being swingable on said hinges and also retractively movable on pivots 9, and means 10 to impose spring bias on the cutters resiliently resisting retraction and also imposing light drag resistance to swinging movement on the hinges 8.

The blade 6 is advantageously formed of a sturdy bar 11 of steel stock having opposite ends 12 which are shown with bevel faces 13 that slope downwardly and outwardly. Said bar 11, by means of clamp nuts 14, is fixed by its middle to the shaft 5 and may be removable for replacement.

The faces 13, or any other abutments provided on the ends of bar 11, are at appreciable angles of which the 45° angles shown are representative.

Each cutter 7 comprises a hardened plate 15 provided with a cutting, scarifying or renovating edge 16 that may be sharpened or not, as desired. It is clear from FIG. 1 that the plates 15 are alike and that their edges 16 are disposed in the same way at each end of the renovator, so as to cut, scarify or renovate when the device is rotated according to arrow 17.

A counterweight 18 is provided on an extension 19 of each plate 15, the same being disposed on one side of the hinge 8 that connects the cutter to the bar end, and the edge 16 being disposed on the opposite side. A hinge 8 is provided at each bar end so that the mass of counterweight 18 is effective to hold the cutter 7 against the bevel edge 19, thereby holding said cutters in a normal downward and outward angle. The pivots 9 connect the cutters 7 to their respective hinges 8 so that, in addition to swinging movement on their hinges, the same may retract on pivots 9 should the edges 16 meet obstructions while cutting, scarifying or renovating. A suitably high speed of rotation of the bar 11 will, by centrifugal force, swing the counterweighted cutters 7 from their angular positions of FIG. 2 to the position of FIG. 3, thereby bringing the cutter edges 16 into cutting, scarifying or renovating engagement with the ground and/or the matted portions thereabove. The position of FIG. 3 may be limited by a stop 20 provided in each hinge 8.

The means 10 is shown as an abutment 21 affixed to a side edge of the bar 11 adjacent each end thereof, and a resilient member 22 carried by each plate extension 19 and in resilient and frictional engagement with the respective abutments 21. The members may be in the form of leaf springs, as shown, or coil springs, that return the cutter 7 to operative positions after retraction caused by obstructions. The counterweights 18 return the cutters to their angular positions when the bar 11 is brought to a stop.

In FIG. 4, the cutter 7a is shown as integral with the bar 11, the same having a renovating, cutting or scarifying edge 16a. Said cutter 7a is at a downward and outward angle more nearly vertical than the angle of the cutters in FIG. 2.

While the foregoing has illustrated and described what is now contemplated to be the best mode of carrying out the invention, the constructions are, of course, subject to modification without departing from the spirit and scope of the invention. Therefore, it is not desired to restrict the invention to the particular forms of construction illustrated and described, but to cover all modifications that may fall within the scope of the appended claims.

Having thus described the invention, what is claimed and desired to be secured by Letters Patent is:

1. A lawn renovator comprising:
   (a) an elongated rotary blade horizontally disposed and rotatable around a vertical axis at the middle thereof,
   (b) a downwardly and outwardly angled cutter extension on each end of the blade and provided with a renovator edge,
   (c) a horizontal hinge connecting each cutter extension to its respective blade end,
   (d) said edge being on one side of said hinge, and
   (e) a counterweight mounted on said cutter extension on the opposite side of the hinge.

2. A lawn mower according to claim 1 provided with resilient means to impose a drag against movement of each cutter extension on its hinge under centrifugal force on the counterweights.

3. In a rotary renovator blade assembly, an end
   (a) comprising a hinged cutter blade on a horizontal pivot and having a renovator edge on one side of the pivot and a counterweight on the opposite side, and
   (b) abutment means to hold the blade at a downward and outward angle relative to the assembly.

4. In a renovator according to claim 3, a pivot for the blade for retractive movement thereof caused by obstruction of the renovator edge during rotation of the assembly.

5. In a renovator according to claim 4, means to impose spring bias on the cutter blade to resiliently resist retractive movement of the blade on its last named pivot.

6. A lawn renovator according to claim 1, provided with spring means to resist upward swinging movement of the blades on their hinges, a pivot for each blade transverse to the horizontal hinge adapting the same for retractive movement, said spring means engaging the blades to resist retractive movement thereof on their pivots.

References Cited by the Examiner

UNITED STATES PATENTS

| | | | |
|---|---|---|---|
| 2,545,173 | 3/1951 | Shaw | 172—59 X |
| 2,720,071 | 10/1951 | Watanabe | 172—96 X |
| 2,740,249 | 4/1956 | Stearns | 56—295 |
| 3,117,633 | 1/1964 | Hosek | 172—69 X |

ABRAHAM G. STONE, *Primary Examiner.*

WILLIAM A. SMITH, III, A. E. KOPECKI,
*Assistant Examiners.*